(12) United States Patent  
Wiese

(10) Patent No.: US 6,557,055 B1
(45) Date of Patent: Apr. 29, 2003

(54) ADAPTIVE THROUGHPUT OPTIMIZATION

(75) Inventor: Michael L. Wiese, Cupertino, CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

(21) Appl. No.: 09/413,529

(22) Filed: Oct. 6, 1999

(51) Int. Cl.[7] ............................................. G06F 13/00
(52) U.S. Cl. ................... 710/36; 710/4; 710/7; 710/17; 710/18; 710/20; 710/33; 710/52; 710/58; 710/60; 710/65; 711/117
(58) Field of Search ..................... 710/4, 7, 17, 18, 710/20, 33, 36, 52, 58, 60, 65; 711/117

(56) References Cited

U.S. PATENT DOCUMENTS

| | | | |
|---|---|---|---|
| 3,702,006 A | 10/1972 | Page | |
| 4,901,232 A | 2/1990 | Harrington et al. | |
| 4,939,644 A | 7/1990 | Harrington et al. | |
| 5,140,683 A | * 8/1992 | Gallo et al. | 711/117 |
| 5,191,653 A | 3/1993 | Banks et al. | |
| 5,283,883 A | * 2/1994 | Mishler | 710/33 |
| 5,301,323 A | 4/1994 | Maeurer et al. | |
| 5,313,584 A | 5/1994 | Tickner et al. | |
| 5,386,517 A | 1/1995 | Sheth et al. | |
| 5,388,219 A | 2/1995 | Chan et al. | |
| 5,499,384 A | 3/1996 | Lentz et al. | |
| 5,535,418 A | * 7/1996 | Suzuki | 710/25 |
| 5,594,926 A | 1/1997 | Chang et al. | |
| 5,613,161 A | 3/1997 | Stanton et al. | |
| 5,659,794 A | 8/1997 | Caldarale et al. | |
| 5,689,725 A | 11/1997 | Eneboe et al. | |
| 5,717,950 A | 2/1998 | Yamaguchi et al. | |
| 5,754,888 A | 5/1998 | Yang et al. | |
| 5,790,810 A | 8/1998 | Kaba | |
| 5,794,035 A | 8/1998 | Golub et al. | |
| 5,944,802 A | * 8/1999 | Bello et al. | 710/52 |
| 6,049,842 A | * 4/2000 | Garrett et al. | 710/33 |
| 6,189,078 B1 | * 2/2001 | Bauman et al. | 711/156 |

* cited by examiner

Primary Examiner—Jeffrey Gaffin
Assistant Examiner—Mohammad O. Farooq
(74) Attorney, Agent, or Firm—Burns, Doane, Swecker & Mathis, L.L.P.

(57) ABSTRACT

Computer system performance may be significantly enhanced by optimizing data throughput during input/output (I/O) operations. In turn, data throughput, during an I/O operation, may be optimized by adaptively modifying the I/O strategy at runtime, and/or continuously throughout the I/O operation, regardless of the specific hardware configuration associated with the I/O devices involved with the I/O operation, as well as additional factors that might otherwise impact the efficiency of the I/O operation.

35 Claims, 4 Drawing Sheets

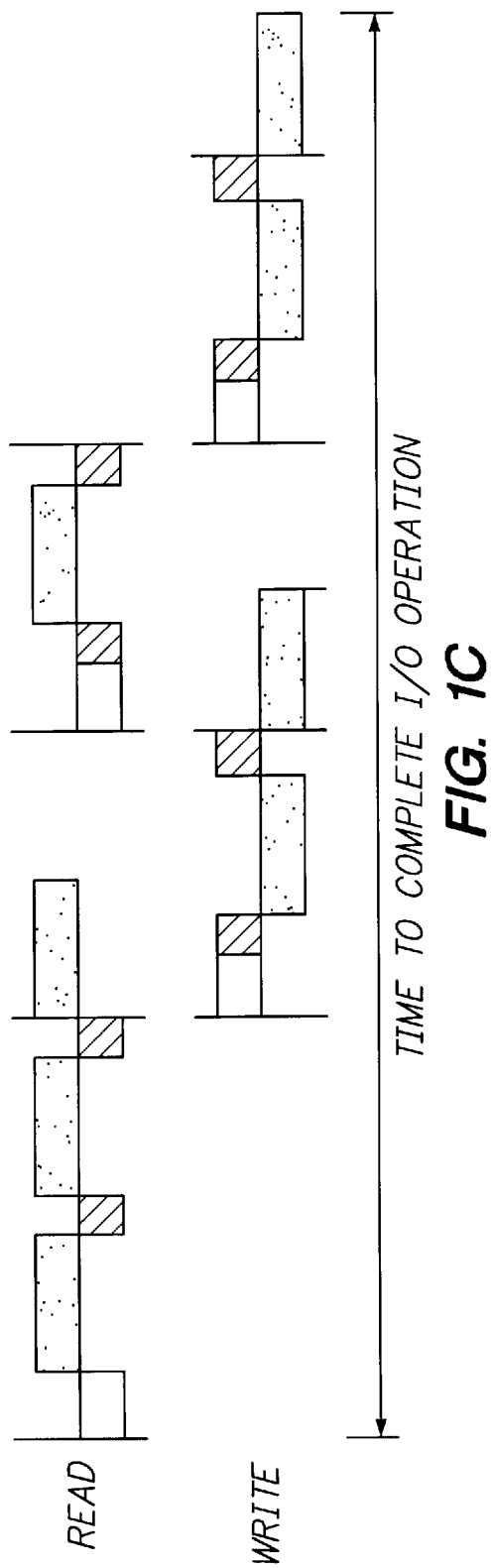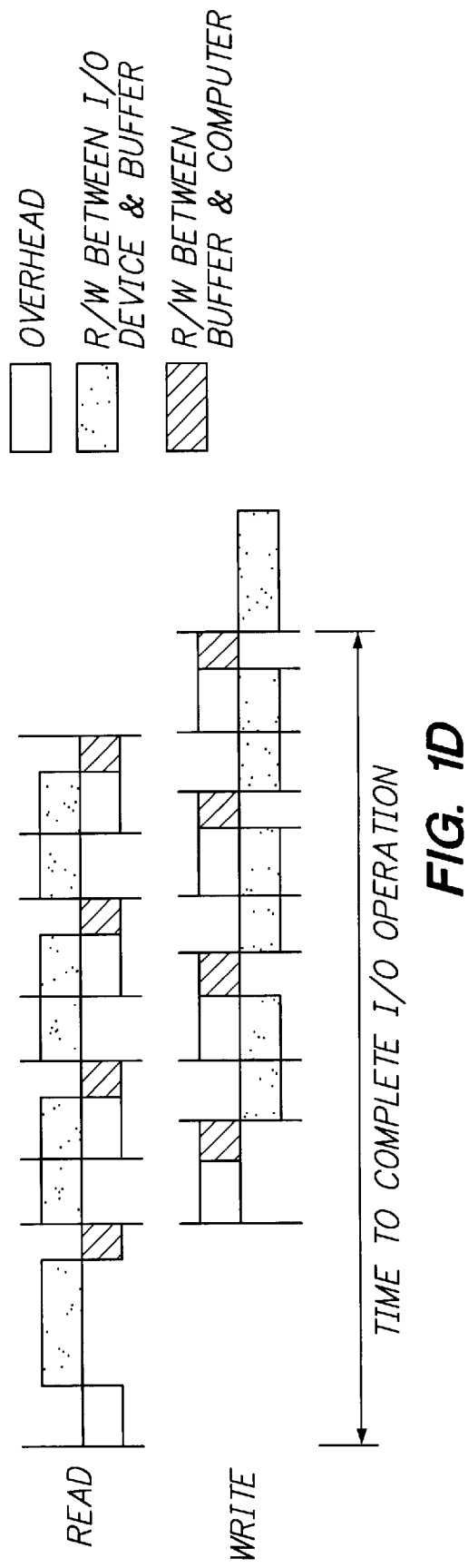

ADAPTIVE THROUGHPUT OPTIMIZATION

FIELD OF INVENTION

The present invention relates to computer systems. More specifically, the present invention relates to optimizing throughput during I/O operations to enhance system performance.

BACKGROUND

Input/Output (I/O) generally refers to the transfer of data between a computer and an I/O device, such as a hard disk. Traditionally, I/O operations were controlled by the central processing unit (CPU). The CPU accomplished this by issuing simple I/O instructions, which may have included nothing more than a read or write command and a source or destination of the data to be transferred.

In more conventional systems, I/O operations are typically controlled by special I/O processors. This gives the CPU more time to execute other critical tasks.

There are many ways to measure the efficiency of an I/O operation. One such way is to measure the "throughput" of the I/O operation. Throughput actually represents the rate at which an I/O operation is performed (e.g., in Megabytes per second). If, for example, an I/O operation involves the transfer of 1 Megabyte of data, and that transfer takes 0.1 seconds to complete, the throughput is 10 Megabytes per second.

Throughput optimization is extremely important, as less than optimal throughput can significantly hinder the overall performance of the computer system. Optimizing throughput is particularly important when the amount of data to be transferred during an I/O operation (i.e., the I/O size) is exceptionally large, which is often the case when data is being transported, for example, over a network a network connection.

There are problems, however, associated with optimizing I/O operation throughput. The main problem is that no single technique or strategy for accomplishing an I/O operation is guaranteed to optimize throughput for each and every set of circumstances associated with the I/O operation. That is because each I/O operation may involve different circumstances, such as, different I/O devices (e.g., hard disks, CD ROMs, network devices), wherein each I/O device exhibits its own distinct characteristics which dictate how an I/O operation involving that I/O device should be accomplished. When the I/O operation involves transferring data over a network connection, network conditions such as traffic load and bandwidth restrictions associated with the network connection may affect throughput, and hence, the ability of one specific I/O technique or strategy to achieve optimal throughput.

Typically, the conventional strategy for optimizing throughput during an I/O operation is to maximize I/O size. In other words, conventional systems attempt to optimize throughput during I/O operations by reading as much data as possible from the source I/O device prior to writing the data to the intended destination I/O device. In theory, maximizing I/O size reduces the number of I/O requests (i.e., the number of read and write commands) that must be issued in order to complete the I/O operation. As will be illustrated in greater detail below, reducing the number of I/O requests reduces the number of hardware and/or software overhead operations that are required to complete the I/O operation, for example, issuing commands to reposition the read and/or write heads associated with a hard disk and, of course, physically repositioning them. While this conventional strategy may optimize I/O throughput under one set of circumstances, there is, as stated above, no guarantee that this same strategy will optimize I/O throughput under another set of circumstances. Simply stated, there are many factors that determine which of several I/O strategies are best suited to optimize throughput during a given I/O operation.

One factor that is highly likely to determine which of several I/O strategies is best suited for optimizing throughput is whether the I/O device (or devices) has an internal buffer or cache. Another factor is the amount of overhead involved with reading and/or writing the data from/to an I/O device. FIGS. 1A–1D illustrate how factors, such as whether an I/O device has an internal buffer, influence whether one I/O strategy, for example, a strategy that involves a relatively large I/O size, is more likely to optimize throughput than another I/O strategy, for example, a strategy that involves a relatively small I/O size.

More specifically, FIG. 1A illustrates the amount of time that may be required to complete an I/O operation that involves reading data from a first I/O device (e.g., a first hard disk) to a computer, and writing that data from the computer to a second I/O device (e.g., a second hard disk), where neither I/O device has an internal buffer or cache. In this example, four relatively small read operations and four relatively small write operations are needed to complete the I/O operation, where a certain amount of hardware and software overhead is associated with each read operation and each write operation.

In contrast, FIG. 1B illustrates that the I/O operation shown in FIG. 1A may be accomplished in a shorter period of time if I/O size is increased. As illustrated, increasing the I/O size results in fewer read and write operations. Fewer read and write operations, in turn, result in less time dedicated to overhead operations. As less time is needed for overhead operations, the overall I/O operation is completed in a shorter period of time. Since the same amount of data is transferred using the I/O strategy illustrated in FIG. 1B as compared to FIG. 1A, the throughput associated with the strategy illustrated in FIG. 1B is greater than the throughput associated with the strategy illustrated in FIG. 1A.

Contrary to the results achieved by employing the I/O strategies illustrated in FIGS. 1A and 1B, FIGS. 1C and 1D together illustrate that a shorter I/O size may result in optimal throughput when the I/O devices employ an internal buffer or cache, particularly "read-ahead" and/or "write-behind" cache, and accordingly, the read and write operations, in whole or in part, overlap in the time domain. More specifically, FIG. 1C illustrates that under these circumstances, a relatively large I/O size results in lower throughput as compared to the strategy shown in FIG. 1D, which involves a relatively small I/O size.

Given the above-identified problems associated with optimizing throughput during I/O operations, it would be highly desirable to provide a method and/or apparatus that is capable of adaptively establishing an I/O operation strategy that is most likely to optimize throughput during any given I/O operation, on a case-by-case basis.

SUMMARY OF THE INVENTION

The present invention involves optimizing throughput during I/O operations. Moreover, the present invention does so at runtime and/or continuously throughout the duration of the I/O operation. Thus, the present invention provides an adaptive technique for optimizing throughput, and it does so regardless of the specific hardware configuration associated with the I/O device or devices involved with the I/O operation, as well as additional factors that might otherwise impact the efficiency of the I/O operation.

In accordance with one aspect of the present invention, a method for adaptively improving throughput during an I/O operation is provided. The method involves transferring an amount of data corresponding to a first I/O request. An amount of data corresponding to a second I/O request is then adapted so that the throughput associated with the second I/O request increases as compared to the throughput associated with the first I/O request.

In accordance with another aspect of the present invention, a method for adaptively improving throughput during an I/O operation is provided. The method involves transferring data from a source device to a destination device through a plurality of I/O requests, and continuously increasing the I/O size of the I/O requests, until throughput has been maximized. Any remaining data associated with the I/O operation is then transferred through one or more I/O requests, where the I/O size associated with the one or more I/O requests is fixed and equal to the I/O size corresponding to maximum throughput.

In accordance with yet another aspect of the present invention, a technique, including a corresponding apparatus, for improving computer performance during an I/O operation is provided, wherein a portion of data associated with the I/O operation is transferred from a source device to a destination device, and a throughput value associated with this transfer of data is measured. A determination is then made as to whether the measured throughput value is greater than a previous throughput value. A next portion of data associated with the I/O operation is then transferred from the source device to the destination device, where the next portion of data is greater than the prior portion of data, if the aforementioned determination indicates that the measured throughput value is greater than the previous throughput value.

In accordance with still another aspect of the present invention, a technique, including a corresponding apparatus, for improving the performance of a computer system during an I/O operation, where a value representing an amount of time to transfer a portion of data from a source device to a destination device is stored. A portion of the data associated with the I/O operation is then transferred from the source device to the destination device, and the time required to complete this transfer is measured. A determination is then made as to whether the the measured amount of time is greater than the stored value. Then, a next portion of data is transferred, where the next portion of data is less than the prior portion of data, if it is determined that the measured amount of time is greater than the stored value. The value associated with the measured amount of time is then stored in place of the previously stored value.

BRIEF DESCRIPTION OF THE FIGURES

The objectives and advantages of the present invention will be understood by reading the following detailed description in conjunction with the drawings, in which:

FIGS. 1A–1D illustrate how the presence of an internal buffer or cache may influence whether one I/O operation strategy should be employed over others to optimize throughput;

DETAILED DESCRIPTION OF THE INVENTION

The present invention involves adaptively maximizing the performance of a computer system during I/O operations. More specifically, the present invention involves a technique that adaptively optimizes data throughput for an I/O operation for any given set of circumstances (e.g., any combination of I/O device hardware), at run-time, on a case-by-case basis. If the I/O operation involves transferring data to or from a network device, the present invention provides a technique that continuously adapts to changes in the network environment over the course of the I/O operation to achieve optimal data throughput.

Figure 1A:
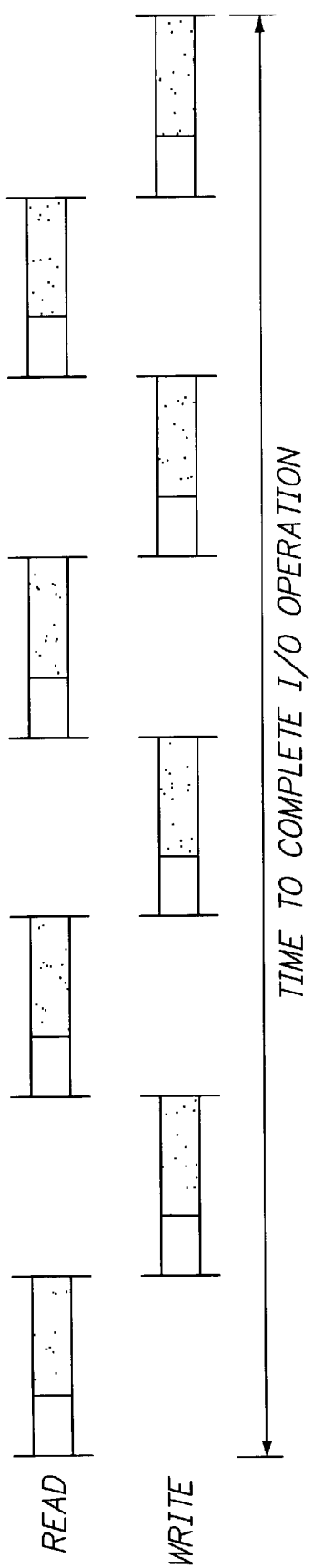
Figure 1B:
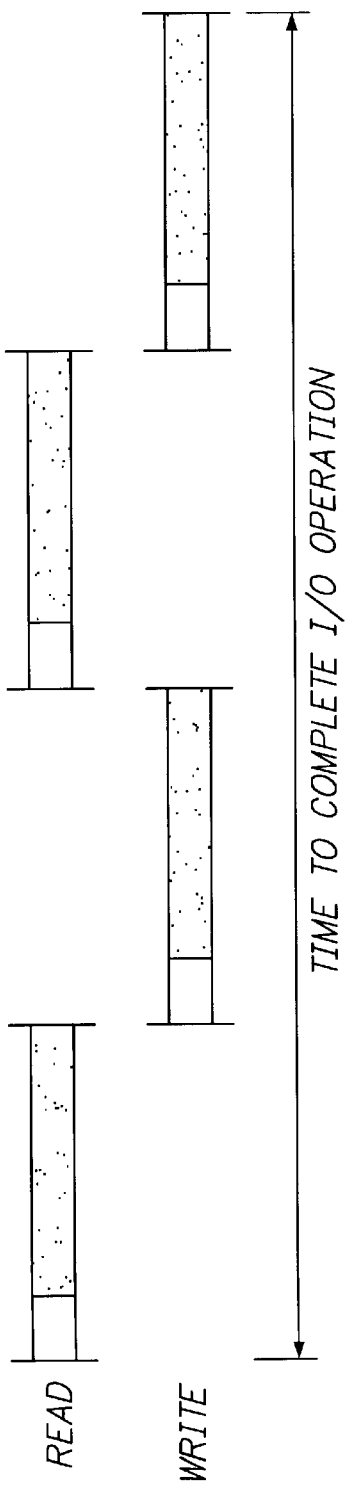
Figure 2:
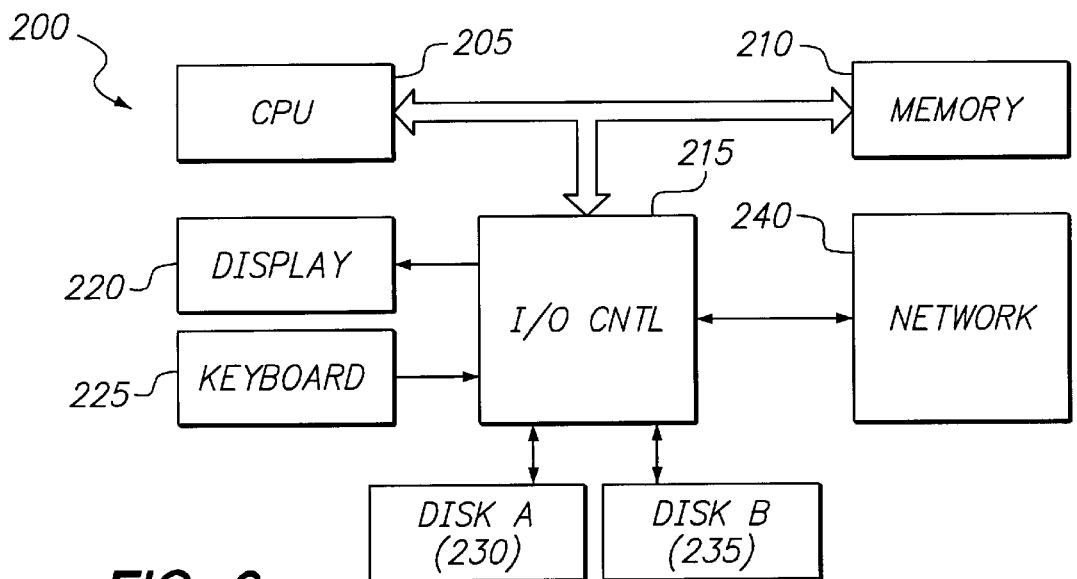
FIG. 2 illustrates the architecture of a conventional computer system.

FIG. 2 illustrates the architecture of a typical computer system 200. The computer system 200 comprises a CPU 205. The CPU 205 controls the operation of the computer system 200, and it contains units which perform the arithmetic and logical operations necessary to execute program instructions. The computer system 200 also includes internal memory 210, including both read-only memory and random access memory, and an I/O control unit 215. The I/O control unit 215 serves as an interface device between the CPU 205 and various I/O devices, such as the display device 220, the keyboard 225, and any number of mass storage devices, for example, disk A (230) and disk B (235), and network devices (not shown) over network 240.

As stated above, the present invention involves a technique that adaptively optimizes I/O throughput for, or during, an I/O operation regardless of the particular hardware configuration associated with the I/O devices, as well as other relevant factors. As one skilled in the art will readily appreciate, the present invention may be implemented in software or firmware, in accordance with standard programming practices, where the software or firmware may, for example, reside in an I/O control unit such as I/O control unit 215.

Figure 3B:
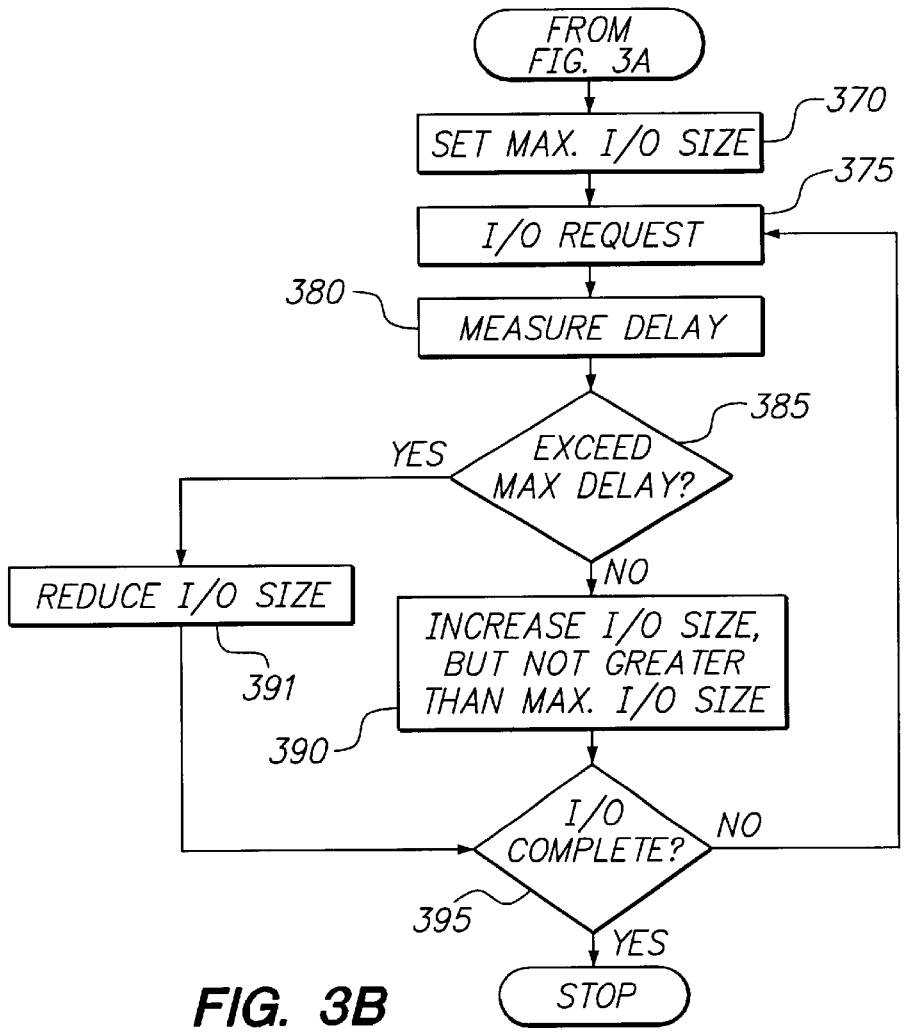
FIG. 3B illustrates a technique, in accordance with exemplary embodiments of the present invention, for maximizing throughput during a network I/O operation.
Figure 3A:
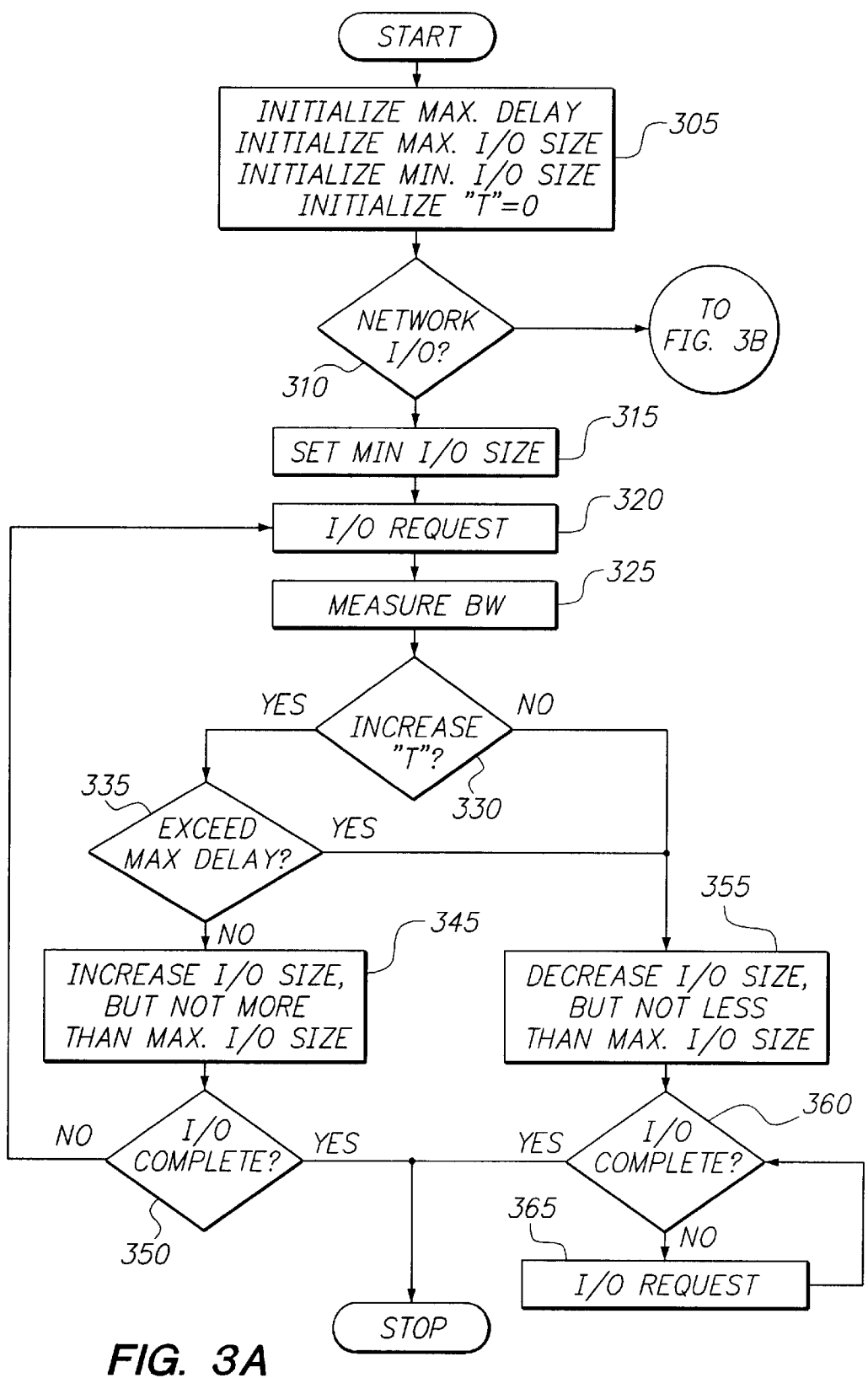
FIG. 3A illustrates a technique, in accordance with exemplary embodiments of the present invention, for maximizing throughput during a non-network I/O operation.

FIGS. 3A and 3B illustrate, in greater detail, an exemplary procedure for achieving the adaptive I/O operation strategy, in accordance with exemplary embodiments of the present invention. As shown in FIG. 3A, a number of variables are initialized during a first procedural step 305. These variables include maximum delay, maximum I/O size, minimum I/O size, and throughput "T". The maximum delay variable represents the maximum amount of time for completing an I/O request (e.g., a read operation and a corresponding write operation). Maximum I/O size represents the maximum amount of data that can be transferred during an I/O request. In contrast, minimum I/O size represents the minimum amount of data that can be transferred during an I/O request.

In decision step 310, it is determined whether the present I/O operation involves transferring data to or from a network device over a network connection. If the I/O operation, for example, involves transferring data from disk A (230) to disk B (235) as shown in FIG. 2, the I/O operation does not involve a network device, in accordance with the "NO" path out of decision step 310. Thereafter, the initial I/O size is set equal to the minimum I/O size, as defined during step 305.

A first I/O request, or data transfer, is then accomplished as shown in step 320, where the amount of data transferred is equal to the minimum I/O size. If the I/O operation involves transferring data from disk A (230) to disk B (235), the first I/O request generally involves reading data from the source disk A (230) into computer memory 210, and thereafter, writing the data from computer memory 210 to the destination disk B (235).

Upon completion of the I/O request, throughput "T" associated with the I/O request is measured, in accordance with step 325. As stated above, throughput "T" represents the amount of time necessary to transfer the data associated with the I/O request. The first time step 325 is executed, throughput "T" reflects the amount of time needed to transfer an amount of data equivalent to the minimum I/O size.

In accordance with decision step 330, it is determined whether an increase in throughput "T" was realized during the most recent I/O request. Of course, during the first iteration of the procedure illustrated in FIG. 3A, throughput "T" inherently increases, since throughput "T" was initially set to zero (0) during step 305. Thus, in accordance with the "YES" path out of decision step 330, the procedure moves to decision step 335, where a determination is made as to whether the time to accomplish the most recent I/O request exceeded the maximum delay, as defined in step 305. If the time required to accomplish the most recent I/O request did not exceed the maximum delay, in accordance with the "NO" path out of decision step 335, the I/O size associated with the next I/O request, if any, is increased by a set amount, in accordance with step 345. However, the I/O size should not exceed the maximum I/O size defined during step 305.

As shown in decision step 350, a determination is made as to whether the I/O operation is complete. If, of course, all of the data has been transferred to the destination I/O device, for example, disk B (235), in accordance with the "YES" path out of decision step 350, the procedure is terminated. If, however, all of the data associated with the I/O operation has not yet been transferred, in accordance with the "NO" path out of decision step 350, a next I/O request is executed, as shown in step 320.

The above-identified procedure is then repeated until the I/O operation is complete, or either one of the following events occurs: the throughput "T" measurement indicates that throughput "T" did not increase over the previous throughput "T" measurement, in accordance with the "NO" path out of decision 330; the amount of time required to complete the most recent I/O request exceeded the maximum delay, in accordance with the "YES" path out of decision step 335. If either of these two events do occur, the procedure moves to step 355, where the I/O size is reduced, for example, to the I/O size used during the previous I/O request, if any. In accordance with a preferred embodiment of the present invention, the I/O size is now fixed for the duration of the I/O operation, which proceeds in accordance with steps 360 and 365, until all the data has been transferred to the destination I/O device.

As previously stated, a determination is initially made as to whether the I/O operation involves transferring data to or from a network device, in accordance with decision step 310. If the I/O operation does involve transferring data to or from a network device, in accordance with the "YES" path out of decision step 310, the I/O size is initially set equal to the maximum I/O size, as shown in step 370 on FIG. 3B. An I/O request is then executed, in accordance with step 375, and upon completion of the I/O request, the time required to accomplish the I/O request is measured, as shown in step 380.

In accordance with decision step 385, it is determined whether the amount of time required to complete the I/O request exceeded the value associated with the maximum delay variable. If the amount of time required to complete the I/O request did exceed the maximum delay, in accordance with the "YES" path out of decision step 385, the I/O size for the next I/O request, if any, is reduced by a set amount, as shown in step 391. If the I/O operation is not yet complete, in accordance with the "NO" path out of decision step 395, another I/O request is executed in accordance with step 375.

If, however, at some point the amount of time required to complete the most recent I/O request is determined to be less than or equal to the maximum desired delay, in accordance with the "NO" path out of decision step 385, the I/O size in increased as shown in step 390. Again, if the I/O operation is not yet complete, in accordance with the "NO" path out of decision step 395, another I/O request is executed as shown in step 375.

The above-identified procedure, in accordance with steps 375–395, is continuously executed until all of the data has been transferred to the destination I/O device. However, one skilled in the art will appreciate that the efficiency of the I/O operation strategy is continuously measured, and the strategy, by virtue of continuously increasing or decreasing I/O size, provides optimal I/O throughput.

The present invention has been described with reference to exemplary embodiments. However, it will be readily apparent to those skilled in the art that it is possible to embody the invention in specific forms other than those described above without departing from the spirit of the invention. The various aspects and exemplary embodiments are illustrative, and they should not be considered restrictive in any way. The scope of the invention is given by the appended claims, rather than the preceding description, and all variations and equivalents thereof which fall within the range of the claims are intended to be embraced therein.

What is claimed is:

1. A method for adaptively improving throughput during an I/O operation comprising the steps of:

transferring an amount of data corresponding to a first I/O request;

adapting an amount of data corresponding to a second I/O request, such that the throughput associated with the second I/O request increases over the throughput associated with the first I/O request; and adapting an amount of data corresponding to each of a number of additional I/O requests, such that the throughput associated with each additional I/O request increases over the throughput associated with a previous I/O request, until the I/O operation is complete.

2. The method of claim 1 further comprising the steps of:

determining whether the throughput associated with the second I/O request represents maximum throughput; and completing a number of additional I/O requests, until the I/O operation is complete, wherein an amount of data associated with each of the additional I/O requests is fixed and equal to the amount of data associated with the second I/O request, if it is determined that the throughput associated with the second I/O request represents maximum throughput.

3. A method for adaptively improving throughput during an I/O operation comprising the steps of:

transferring data associated with the I/O operation from a source device to a destination device through a plurality of I/O requests;

continuously increasing the I/O size of the I/O requests, until throughput has been maximized; and transferring any remaining data associated with the I/O operation through one or more I/O requests, wherein the I/O size associated with the one or more I/O requests is fixed and equal to the I/O size corresponding to maximum throughput.

4. The method of claim 3 further comprising the steps of:

measuring the throughput associated with an I/O request;

comparing the throughput measurement associated with the I/O request to a throughput measurement associated with a previous I/O request; and determining whether the throughput has been maximized based on said step of comparing the throughput measurements.

5. The method of claim 4, wherein said step of determining whether the throughput has been maximized comprises the step of:

determining whether the throughput associated with the I/O request is less than or equal to the throughput associated with the previous I/O request.

6. A method for improving computer performance during an I/O operation comprising the steps of:

transferring a portion of data associated with the I/O operation from a source device to a destination device;

measuring a throughput value associated with transferring said portion of data;

determining whether the measured throughput value is greater than a previous throughput value; and transferring a next portion of data associated with the I/O operation from the source device to the destination device, wherein the next portion of data is greater than the prior portion of data, if the measured throughput value is determined to be greater than the previous throughput value.

7. The method of claim 6 further comprising the step of:

transferring a next portion of data associated with the I/O operation from the source device to the destination device, wherein the size of the next portion of data is set equal to a fixed amount that is less than the size of a previously transferred portion of data, if a measured throughput value associated with the previously transferred portion of data is not greater than a previously measured throughput value.

8. The method of claim 7, further comprising the step of:

transferring additional portions of data associated with the I/O operation, until all of the data associated with the I/O operation has been transferred, wherein the size of each additional portion of data is equivalent to said fixed amount.

9. The method of claim 6, further comprising the steps of:

determining whether an amount of time required to transfer the portion of data exceeded a maximum amount of time, if it is previously determined that the measured throughput value is greater than the previous throughput value; and if it is determined that the amount of time required to transfer the portion of data exceeded the maximum amount of time, setting the size of a next portion of data to be transferred, if any, to a fixed amount that is less than or equal to the size of a previously transferred portion of data.

10. The method of claim 9, further comprising the step of:

transferring additional portions of data associated with the I/O operation from the source device to the destination device, until all of the data associated with the I/O operation has been transferred, wherein the size of each additional portion of data is equivalent to said fixed amount.

11. The method of claim 9 further comprising the step of:

increasing the size of a next portion of data to be transferred, if any, if it is determined that the amount of time required to transfer the portion of data did not exceed the maximum amount of time.

12. A method for improving the performance of a computer system during an ion that involves the transfer of a quantity of data, said method comprising the steps of:

storing a value representing an amount of time to transfer a portion of data from a source device to a destination device;

transferring a portion of the data from the source device to the destination device;

measuring the time required to complete said step of transferring the portion of data from the source device to the destination device;

determining whether the measured amount of time is greater than the stored value;

transferring a next portion of data, where the next portion of data is less than the prior portion of data, if it is determined that the measured amount of time is greater than the stored value; and storing the value associated with the measured amount of time in place of the previously stored value.

13. The method of claim 12 further comprising the step of:

transferring a next portion of data, where the next portion of data is greater than the prior portion of data, if it is determined that the measured amount of time is less than the stored value.

14. The method of claim 13 further comprising the step of:

repeating said steps of transferring a next portion of data, wherein the next portion of data is less than the prior portion of data, if it is determined that the measured amount of time is greater than the stored value, and wherein the next portion of data is greater than the prior portion of data, if it is determined that the measured amount of time is less than the stored value, until the quantity of data associated with the I/O operation has been transferred from the source device to the destination device.

15. The method of claim 14, wherein the portions of data are transferred between a network device and the computer system.

16. A computer system comprising:

means for transferring a portion of data associated with an I/O operation from a source device to a destination device;

means for measuring a throughput value associated with transferring said portion of data;

means for determining whether the measured throughput value is greater than a previous throughput value; and means for transferring a next portion of data associated with the I/O operation from the source device to the destination device, wherein the next portion of data is greater than the prior portion of data, if the measured throughput value associated with the transfer of the prior portion of data is greater than a previous throughput value.

17. The computer system of claim 16 further comprising:

means for transferring a next portion of data associated with the I/O operation from the source device to the destination device, wherein the size of the next portion of data is set equal to a fixed amount that is less than the size of a previously transferred portion of data, if a measured throughput value associated with the previously transferred portion of data is not greater that a previously measured throughput value.

18. The computer system of claim 17 further comprising:

means for transferring additional portions of data associated with the I/O operation, until all of the data associated with the I/O operation has been transferred, wherein the size of each additional portion of data is equivalent to said fixed amount.

19. The computer system of claim 16 further comprising:

means for determining whether an amount of time required to transfer the portion of data exceeded a maximum amount of time, if it is previously determined that the measured throughput value is greater than the previous throughput value; and if it is determined that the amount of time required to transfer the portion of data exceeded the maximum amount of time, means for setting the size of a next portion of data to be transferred, if any, to a fixed amount that is less than or equal to the size of a previously transferred portion of data.

20. The computer system of claim 19 further comprising:

means for transferring additional portions of data associated with the I/O operation from the source device to the destination device, until all of the data associated with the I/O operation has been transferred, wherein the size of each additional portion of data is equivalent to said fixed amount.

21. The computer system of claim 19 further comprising:

means for increasing the size of a next portion of data to be transferred, if any, if it is determined that the amount of time required to transfer the portion of data did not exceed the maximum amount of time.

22. A computer system comprising:

means for storing a value that represents an amount of time to transfer a portion of data associated with an I/O operation from a source device to a destination device;

means for transferring a portion of the data from the source device to the destination device;

means for measuring the time required to transfer the portion of data from the source device to the destination device;

means for determining whether the measured amount of time is greater than the stored value;

means for transferring a next portion of data associated with the I/O operation, where the next portion of data is less than the previous portion of data, if it is determined that the measured amount of time is greater than the stored value; and means for storing the value associated with the measured amount of time in place of the previously stored value.

23. The computer system of claim 22 further comprising:

means for transferring a next portion of data associated with the I/O operation, where the next portion of data is greater than the prior portion of data, if it is determined that the measured amount of time is less than the stored value.

24. The computer system claim 23 further comprising:

means for repeatedly transferring a next portion of data associated with the I/O operation, wherein the next portion of data is less than the prior portion of data, if it is determined that the measured amount of time is greater than the stored value, and wherein the next portion of data is greater than the prior portion of data, if it is determined that the measured amount of time is less than the stored value, until the quantity of data associated with the I/O operation has been transferred from the source device to the destination device.

25. The computer system of claim 22, wherein the portions of data are transferred between a network device and the computer system.

26. A computer-readable medium having stored there on, a computer program that adaptively optimizes throughput for an I/O operation, said computer program comprising the executable steps of:

storing a value for throughput;

storing a value for I/O size;

moving a portion of data associated with the I/O operation from a source device to a destination device, wherein the I/O size associated with the portion of data is equivalent to the stored value associated with I/O size;

measuring the throughput associated with moving the portion of data;

determining whether the measured throughput value is greater than the stored throughput value; and increasing the I/O size of a next portion of data to be transferred during the I/O operation, if it was determined that the measured throughput value is greater than the stored throughput value; and moving a next portion of data associated with the I/O operation from the source device to the destination device.

27. The computer program of claim 26 further comprising the executable steps of:

incrementing the I/O size of additional portions of data, and thereafter, moving each additional portion of data from the source device to the destination device, if a measured throughput value associated with moving a prior portion of data is determined to be greater than the previous throughput value; and decrementing the size of a next portion of data, such that the I/O size of the next portion of data is set equal to a fixed I/O size that is less than the I/O size associated with the prior portion of data, if it is determined that a measured throughput value associated with the prior portion of data is not greater that the previous throughput value.

28. The computer program of claim 27 further comprising the executable steps of:

moving additional portions of data associated with the I/O operation, until all of data associated with the I/O operation has been moved, wherein the I/O size associated with each additional portion of data is equivalent to said fixed I/O size.

29. The computer program of claim 26 further comprising the executable steps of:

measuring an amount of time required to move the portion of data from the source device to the destination device;

determining whether the measured amount of time exceeded a maximum amount of time allotted for moving the portion of data from the source device to the destination device, if it is determined that the measured throughput value is greater than the stored throughput value; and if it is determined that the measured amount of time exceeded the maximum amount of time, setting the I/O size associated with a next portion of data to be moved, if any, to a fixed I/O size that is less than or equal to the I/O size of the prior portion of data.

30. The computer program of claim 29 further comprising the executable steps of:

moving additional portions of data, until all data associated with the I/O operation has been moved, wherein the I/O size associated with each additional portion of data is equivalent to said fixed I/O size.

31. The computer program of claim 29 further comprising the executable step of:

incrementing the size of a next portion of data to be transferred, if any, if it is determined that the measured amount of time did not exceed the maximum amount of time.

32. A computer-readable medium having stored thereon, a computer program that adaptively optimizes data throughput for an I/O operation, said computer program comprising the executable steps of:

storing a value representing an amount of time to move a portion of data from a source device to a destination device;

moving a portion of the data associated with the I/O operation from the source device to the destination device;

measuring the time required to move the portion of data;

determining whether the measured amount of time is greater than the stored value;

moving a next portion of data associated with the I/O operation, where the I/O size associated with the next portion of data is less than the I/O size of the prior portion of data, if it is determined that the measured amount of time is greater than the stored value; and storing the value associated with the measured amount of time in place of the previously stored value.

33. The computer program of claim 32 further comprising the executable steps of:

moving a next portion of data associated with the I/O operation, where the I/O size associated with the next portion of data is greater than the I/O size of the prior portion of data, if it is determined that a measured amount of time required to move a prior portion of data from the source device to the destination device is less than the stored value.

34. The computer program of claim 33 further comprising the executable steps of:

repeatedly moving a next portion of data associated with the I/O operation, wherein the I/O size associated with the next portion of data is set equal to an amount that is less than the I/O size of a previous portion of data, if it is determined that a measured amount of time required to move the previous portion of data is greater than a stored value, and wherein the I/O size associated with the next portion of data is set equal to an amount that is greater than the I/O size associated with the previous portion of data, if it is determined that the measured amount of time required to move the previous portion of data is less than the stored value, until all of the data associated with the I/O operation has been moved from the source device to the destination device.

35. The computer program of claim 33, wherein the portions of data are transferred over a network connection between a network device and the computer system.

* * * * *